United States Patent
Belcea

(10) Patent No.: US 7,349,441 B2
(45) Date of Patent: Mar. 25, 2008

(54) METHOD FOR OPTIMIZING COMMUNICATION WITHIN A WIRELESS NETWORK

(75) Inventor: John M. Belcea, West Melbourne, FL (US)

(73) Assignee: Meshnetworks, Inc., Maitland, FL (US)

(*) Notice: Subject to any disclaimer, the term of this patent is extended or adjusted under 35 U.S.C. 154(b) by 767 days.

(21) Appl. No.: 10/861,668

(22) Filed: Jun. 4, 2004

(65) Prior Publication Data

US 2004/0246986 A1    Dec. 9, 2004

Related U.S. Application Data

(60) Provisional application No. 60/546,942, filed on Feb. 24, 2004, provisional application No. 60/476,167, filed on Jun. 6, 2003, provisional application No. 60/476,232, filed on Jun. 6, 2003.

(51) Int. Cl.
*H04J 3/06* (2006.01)
(52) U.S. Cl. ...................................... 370/503
(58) Field of Classification Search ................ 370/252, 370/444, 503, 507, 508, 509, 512
See application file for complete search history.

(56) References Cited

U.S. PATENT DOCUMENTS

| | | | |
|---|---|---|---|
| 4,494,192 A | 1/1985 | Lew et al. | |
| 4,617,656 A | 10/1986 | Kobayashi et al. | |
| 4,736,371 A | 4/1988 | Tejima et al. | |
| 4,742,357 A | 5/1988 | Rackley | |
| 4,747,130 A | 5/1988 | Ho | |
| 4,910,521 A | 3/1990 | Mellon | |
| 5,034,961 A | 7/1991 | Adams | |
| 5,068,916 A | 11/1991 | Harrison et al. | |
| 5,231,634 A | 7/1993 | Giles et al. | |
| 5,233,604 A | 8/1993 | Ahmadi et al. | |
| 5,241,542 A | 8/1993 | Natarajan et al. | |
| 5,317,566 A | 5/1994 | Joshi | |
| 5,365,516 A * | 11/1994 | Jandrell | 370/335 |
| 5,392,450 A | 2/1995 | Nossen | |
| 5,412,654 A | 5/1995 | Perkins | |
| 5,424,747 A | 6/1995 | Chazelas | |
| 5,502,722 A | 3/1996 | Fulghum | |

(Continued)

FOREIGN PATENT DOCUMENTS

CA    2132180    3/1996

(Continued)

OTHER PUBLICATIONS

Wong, et al., "Soft Handoffs in CDMA Mobile Systems," Dec. 1997, IEEE Personal Communications.

(Continued)

*Primary Examiner*—Seema S. Rao
*Assistant Examiner*—Mon Cheri S Davenport
(74) *Attorney, Agent, or Firm*—Randi L. Karpinia; Joseph J. Buczynski

(57) ABSTRACT

A system and method for providing a MAC protocol that optimizes communication within a wireless network. Specifically, the system and method operates with Mobile Terminals, Fixed References and at least one Main Control, wherein a method defines the sequence of messages exchanged between each Mobile Terminals, Fixed Reference and the Main Control for assuring the data is optimally communicated within the network.

16 Claims, 9 Drawing Sheets

U.S. PATENT DOCUMENTS

| | | | |
|---|---|---|---|
| 5,517,491 A | 5/1996 | Nanni et al. | |
| 5,555,425 A | 9/1996 | Zeller et al. | |
| 5,555,540 A | 9/1996 | Radke | |
| 5,572,528 A | 11/1996 | Shuen | |
| 5,615,212 A | 3/1997 | Ruszczyk et al. | |
| 5,618,045 A | 4/1997 | Kagan et al. | |
| 5,621,732 A | 4/1997 | Osawa | |
| 5,623,495 A | 4/1997 | Eng et al. | |
| 5,627,976 A | 5/1997 | McFarland et al. | |
| 5,631,897 A | 5/1997 | Pacheco et al. | |
| 5,644,576 A | 7/1997 | Bauchot et al. | |
| 5,652,751 A | 7/1997 | Sharony | |
| 5,680,392 A | 10/1997 | Semaan | |
| 5,684,794 A | 11/1997 | Lopez et al. | |
| 5,687,194 A | 11/1997 | Paneth et al. | |
| 5,696,903 A | 12/1997 | Mahany | |
| 5,701,294 A | 12/1997 | Ward et al. | |
| 5,706,428 A | 1/1998 | Boer et al. | |
| 5,717,689 A | 2/1998 | Ayanoglu | |
| 5,745,483 A | 4/1998 | Nakagawa et al. | |
| 5,774,876 A | 6/1998 | Wooley et al. | |
| 5,781,540 A | 7/1998 | Malcolm et al. | |
| 5,787,080 A | 7/1998 | Hulyalkar et al. | |
| 5,794,154 A | 8/1998 | Bar-On et al. | |
| 5,796,732 A | 8/1998 | Mazzola et al. | |
| 5,796,741 A | 8/1998 | Saito et al. | |
| 5,805,593 A | 9/1998 | Busche | |
| 5,805,842 A | 9/1998 | Nagaraj et al. | |
| 5,805,977 A | 9/1998 | Hill et al. | |
| 5,809,518 A | 9/1998 | Lee | |
| 5,822,309 A | 10/1998 | Ayanoglu et al. | |
| 5,844,905 A | 12/1998 | McKay et al. | |
| 5,845,097 A | 12/1998 | Kang et al. | |
| 5,857,084 A | 1/1999 | Klein | |
| 5,870,350 A | 2/1999 | Bertin et al. | |
| 5,877,724 A | 3/1999 | Davis | |
| 5,881,095 A | 3/1999 | Cadd | |
| 5,881,372 A | 3/1999 | Kruys | |
| 5,886,992 A | 3/1999 | Raatikainen et al. | |
| 5,896,561 A | 4/1999 | Schrader et al. | |
| 5,903,559 A | 5/1999 | Acharya et al. | |
| 5,909,651 A | 6/1999 | Chander et al. | |
| 5,913,170 A * | 6/1999 | Wortham | 455/457 |
| 5,936,953 A | 8/1999 | Simmons | |
| 5,943,322 A | 8/1999 | Mayer et al. | |
| 5,987,011 A | 11/1999 | Toh | |
| 5,987,033 A | 11/1999 | Boer et al. | |
| 5,991,279 A | 11/1999 | Haugli et al. | |
| 6,028,853 A | 2/2000 | Haartsen | |
| 6,029,217 A | 2/2000 | Arimilli et al. | |
| 6,034,542 A | 3/2000 | Ridgeway | |
| 6,044,062 A | 3/2000 | Brownrigg et al. | |
| 6,047,330 A | 4/2000 | Stracke, Jr. | |
| 6,052,594 A | 4/2000 | Chuang et al. | |
| 6,052,752 A | 4/2000 | Kwon | |
| 6,064,626 A | 5/2000 | Stevens | |
| 6,067,291 A | 5/2000 | Kamerman et al. | |
| 6,067,297 A | 5/2000 | Beach | |
| 6,078,566 A | 6/2000 | Kikinis | |
| 6,104,712 A | 8/2000 | Robert et al. | |
| 6,108,738 A | 8/2000 | Chambers et al. | |
| 6,115,580 A | 9/2000 | Chuprun et al. | |
| 6,122,690 A | 9/2000 | Nannetti et al. | |
| 6,130,881 A | 10/2000 | Stiller et al. | |
| 6,132,306 A | 10/2000 | Trompower | |
| 6,147,975 A | 11/2000 | Bowman-Amuah | |
| 6,163,699 A * | 12/2000 | Naor et al. | 455/453 |
| 6,178,337 B1 | 1/2001 | Spartz et al. | |
| 6,192,053 B1 | 2/2001 | Angelico et al. | |
| 6,192,230 B1 | 2/2001 | Van Bokhorst et al. | |
| 6,208,870 B1 | 3/2001 | Lorello et al. | |
| 6,222,463 B1 | 4/2001 | Rai | |
| 6,222,504 B1 | 4/2001 | Oby | |
| 6,223,240 B1 | 4/2001 | Odenwald et al. | |
| 6,240,294 B1 | 5/2001 | Hamilton et al. | |
| 6,246,875 B1 | 6/2001 | Seazholtz et al. | |
| 6,249,516 B1 | 6/2001 | Brownrigg et al. | |
| 6,275,707 B1 * | 8/2001 | Reed et al. | 455/456.3 |
| 6,285,892 B1 | 9/2001 | Hulyalkar | |
| 6,304,556 B1 | 10/2001 | Haas | |
| 6,327,300 B1 | 12/2001 | Souissi et al. | |
| 6,349,091 B1 | 2/2002 | Li | |
| 6,349,210 B1 | 2/2002 | Li | |
| 6,359,872 B1 | 3/2002 | Mahany et al. | |
| 6,366,568 B1 | 4/2002 | Bolgiano et al. | |
| 6,405,049 B2 | 6/2002 | Herrod et al. | |
| 6,542,494 B1 | 4/2003 | Sugaya et al. | |
| 6,845,091 B2 * | 1/2005 | Ogier et al. | 370/338 |
| 6,898,433 B1 * | 5/2005 | Rajaniemi et al. | 455/456.1 |
| 7,155,237 B2 * | 12/2006 | Porcino | 455/456.1 |
| 7,231,216 B2 * | 6/2007 | Tafazolli et al. | 455/456.1 |
| 7,254,401 B2 * | 8/2007 | Keranen et al. | 455/456.1 |
| 2001/0053699 A1 | 12/2001 | McCrady et al. | |
| 2002/0013856 A1 | 1/2002 | Garcia-Luna-Aceves | |
| 2002/0086682 A1 * | 7/2002 | Naghian | 455/456 |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| WO | WO 9608884 | 3/1996 |
| WO | WO 9724005 | 7/1997 |
| WO | WO 9839936 | 9/1998 |
| WO | WO 98/52376 A1 | 11/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al., "A Pattern Recognition System for Handoff Algorithms," Jul. 2000, IEEE Journal on Selected Areas in Communications, vol. 18, No. 7.

Andras G. Valko, "Cellular IP: A New Approach to Internet Host Mobility," Jan. 1999, ACM Computer Communication Review.

Richard North, Dale Bryan and Dennis Baker, "Wireless Networked Radios: Comparison of Military, Commercial and R&D Protocols," Feb. 28-Mar. 3, 1999, 2nd Annual UCSD Conference on Wireless Communications, San Diego, CA.

Benjamin B. Peterson, Chris Kmiecik, Richard Hartnett, Patrick M. Thompson, Jose Mendoza and Hung Nguyen, "Spread Spectrum Indoor Geolocation," Aug. 1998, Navigation: Journal of the Institute of Navigation, vol. 45, No. 2, Summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols," Oct. 25-30, 1998, Proceedings of the 4th Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing, Self-Healing Wireless Networks," 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol," Aug. 1999, IEEE Journal on Selected Areas in Communications, vol. 17, No. 8.

Ad Kamerman and Guido Aben, "Net Throughput with IEEE 802.11 Wireless LANs".

J. R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks Using Transmit Power Adjustment".

Ram Ramanathan and Martha E. Steenstrup, "Hierarchically-Organized, Multihop Mobile Wireless Networks for Quality-of-Service Support".

Martha E. Steenstrup, "Dynamic Multipoint Virtual Circuits for Multimedia Traffic in Multihop Mobile Wireless Networks".

Zhenya Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

* cited by examiner

METHOD FOR OPTIMIZING COMMUNICATION WITHIN A WIRELESS NETWORK

The present application claims benefit under 35 U.S.C. § 119(e) from a U.S. Provisional Patent Application of John M. Belcea et al. entitled "System and Method for Identifying the Floor Number Where a Firefighter in Need of Help is Located Using Received Signal Strength Indicator and Signal Propagation Time", Ser. No. 60/546,942, filed on Feb. 24, 2004, from a U.S. Provisional Patent Application of John M. Belcea, entitled "System and Method for Accurately Computing the Position of Wireless Devices Inside High-Rise Buildings", Ser. No. 60/476,167, filed on Jun. 6, 2003, and from a U.S. Provisional Patent Application of John M. Belcea, entitled "MAC Protocol for Accurately Computing the Position of Wireless Devices Inside Buildings", Ser. No. 60/476,232, filed on Jun. 6, 2003, the entire contents of each application being incorporated herein by reference.

BACKGROUND OF THE INVENTION

1. Field of the Invention

The present invention relates to a system and method for a MAC protocol that allows the collection of a large number of range measurements, and based upon such measurements, permits a very precise computation of the location of terminals inside a building. Specifically, the system and method operates with Mobile Terminals, Fixed References and at least one Main Control, wherein a MAC protocol defines the sequence of messages exchanged between such Mobile Terminals, Fixed References and the Main Control for assuring the data needed for computing the location is collected and correctly transferred.

2. Description of the Related Art

Wireless communication networks, such as mobile wireless telephone networks, have become increasingly prevalent over the past decade. These wireless communications networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the base node coverage area. The communications signals include, for example, voice data that has been sampled and modulated according to a desired modulation technique and transmitted as data packets. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at the base node to communicate simultaneously with several mobile nodes in its coverage area.

In recent years, a type of mobile communications network known as an "ad-hoc multi-hopping" network has been developed for use by the military. In this type of network, each mobile node is capable of operating as a base station or router for the other mobile nodes, thus eliminating the need for a fixed infrastructure of expensive base stations. Details of an ad-hoc multi-hopping networks are set forth in U.S. Pat. No. 5,943,322 to Mayor, the entire content of which is incorporated herein by reference.

More sophisticated ad-hoc multi-hopping networks are also being developed which, in addition to enabling mobile nodes to communicate with each other as in a conventional ad-hoc network, further enable the mobile nodes to access a fixed network and thus communicate with fixed nodes, such as those on the public switched telephone network (PSTN), and on other mobile or fixed networks such as cellular telephone networks and the Internet. Details of these advanced types of ad-hoc networks are described in U.S. Pat. No. 7,072,650 B2 entitled "Ad Hoc Peer-to-Peer Mobile Radio Access System Interfaced to the PSTN and Cellular Networks", granted on Jul. 4, 2006, in U.S. Pat. No. 6,807,165 B2 entitled "Time Division Protocol for an Ad-Hoc, Peer-to-Peer Radio Network Having Coordinating Channel Access to Shared Parallel Data Channels with Separate Reservation Channel", granted on Oct. 19, 2004, and in U.S. Pat. No. 6,873,839 B2 entitled "Prioritized-Routing for an Ad-Hoc, Peer-to-Peer, Mobile Radio Access System", granted on Mar. 29, 2005, the entire content of each application being incorporated herein by reference.

In either conventional wireless communications networks, or in ad-hoc wireless communications networks, it may be necessary or desirable for a mobile node to be capable of knowing or determining a relative or absolute geographic location or position. As known to those skilled in the art, this can be achieved through the use of a number of technologies. These technologies can use cell identification, combined with Round Trip Time (RTT), Timing Advance (TA) and Measured Signal level (RX level), Time Difference of Arrival (TDOA) and Angle Of Arrival (AOA) techniques, the details of which can be appreciated by one skilled in the art. Another available technology uses cellular signal timing based methods for code division multiple access (CDMA) and wideband code division multiple access (WCDMA). Yet another technology uses Global Positioning System (GPS) techniques, which is generally viewed as being more accurate than all other methods listed.

Despite the fact that the GPS technique has been in use for a considerable period of time and most of the world's navigation relies on this technique, the GPS technique is very susceptible to errors in measurement. Therefore, the GPS technique is capable of providing location determination results with very high accuracy only after performing a relatively large number of measurements to remove such errors. A description of the shortcomings of GPS is set forth in a document by the Institute For Mathematics and its Applications (IMA) entitled "Mathematical Challenges in Global Positioning Systems (GPS)", the entire content of which being incorporated herein by reference. Other tests also demonstrate that the GPS technique is unsuitable for those terrestrial-based networks operating in locations where the number of simultaneous visible satellites is too small or not existent, like in underground tunnels, inside buildings, or in urban "canyons".

To overcome the above issues with determining location information, ad-hoc networks are being developed which do not require either the use of satellites or a centralized computing facility for determining location information. Further details of such ad-hoc networks are described in U.S. Pat. No. 6,728,545 entitled "System and Method for Computing the Location of a Mobile Terminal in a Wireless Communications Network", the entire contents of which is incorporated herein by reference. Additionally, ad-hoc multi-hopping networks can be developed utilizing non-fixed, or movable infrastructure components. Further details of networks using movable access points and repeaters for minimizing coverage and capacity constraints are described in U.S. Pat. No. 7,206,294 entitled "Movable Access Points and Repeaters for Minimizing Coverage and Capacity Constraints in a Wireless Communications Network and a Method for Using the Same", granted on Apr. 17, 2007, the entire content being incorporated herein by reference. The precision of computed location with methods using Time Of Flight (TOF) as a measurement of the distance between terminals, is very dependent on the precision of the TOA. A method for improving the precision of the TOA is described in published U.S. Pat. No. 7,054,126 entitled "System and method for improving the accuracy of time of arrival measurements in a wireless ad-hoc communications network" granted on May 30, 2006 the entire contents of which is incorporated herein by reference.

The publications discussed above generally relate to mobile networks that connect to a permanent fixed network. However, as can be appreciated from the information referenced above, wireless ad-hoc multi-hopping networks do not necessarily have the same requirements, and include numerous communication issues that must be addressed in position determination. Accordingly, a need exists for a system and method for easily communicating the information required for calculating absolute and/or relative location of a mobile node.

SUMMARY OF THE INVENTION

Another object of the present invention is to provide a system and method for a MAC protocol for controlling a plurality of Mobile Terminal communication.

Another object of the present invention is to provide a system and method for a MAC protocol for controlling a plurality of Fixed Reference communications.

Another object of the present invention is to provide a system and method for a MAC protocol for controlling a Main Control communication.

These and other objects are substantially achieved by providing a system and method for a MAC protocol controlling the functions of each Mobile Terminal and Fixed Reference. The MAC protocol operates with Wireless devices, such as Mobile Terminals, Fixed References and at least one Main Control, wherein the protocol defines the sequence of messages exchanged between each device and the Main Control for optimizing communications within the network.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

The embodiments of the present invention described below each include a system and method for a MAC protocol that directs the communication between Mobile Terminals, Fixed References and Main Controls, and defines the sequence of messages exchanged. The embodiments of the present invention described below include a Protocol which is specifically designed for supporting location applications. Such applications provide the location of mobile network members, or nodes such as MEA™ terminals, with a precision better then two meters more than 90% of time. The application also supports the activity of workers operating in emergency conditions, such as firefighters, law enforcement, military and others. The application further provides accurate position of the mobile network members and allows voice exchange between members of the team involved in an operation.

Table 1 below defines multiple abbreviations presented in the discussions of the embodiments of the present invention.

TABLE 1

| | |
|---|---|
| AT | Arrival Time (measured in Tc) |
| ATP | Adaptive control of Transmit Power |
| CAT | Corrected Arrival Time (measured in ns) |
| DR | Message Data Request |
| FR | Fixed Reference |
| FRR | Message Fixed Reference Range |
| GUI | Graphic User Interface |
| MC | Main Control |
| MLP | MeshLocation Protocol |
| MRD | Mobile Range Data (message) |
| MRR | Mobile Range Request (message) |
| MT | Mobile Terminal |
| NI | Network Interface |
| PMRD | Pre Mobile Range Data (message) |
| PRDS | Pre Range Data Set (message) |
| PSTN | Public Service Telephone Network |
| RA | Registration Acknowledged (message) |
| RDS | Range Data Set (message) |
| RR | Registration Request (message) |
| RRRR | Ready to Receive Registration Requests (message) |
| Rx | Receiver |
| Tc | Chip Time (time for transmitting one chip) |
| TS | Time Slice (used in this protocol as time unit for timeout functions). |
| Tx | Transmitter |
| VD | Voice Data (message) |

Figure 1:
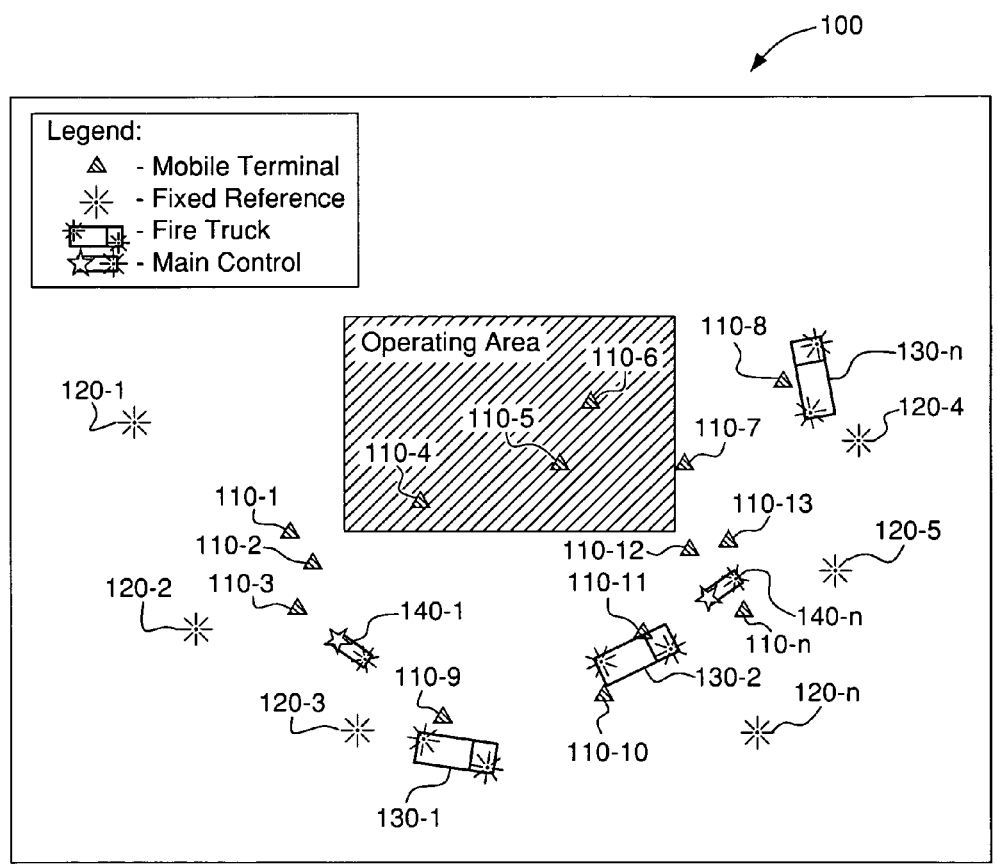
FIG. 1 is a top view diagram of an example ad-hoc wireless communications network including a plurality of nodes in accordance with an embodiment of the present invention deployed for providing location services in a fire incident.

FIG. 1 illustrates an example network 100, providing communications and location services in a fire incident. In the operation associated with the embodiment described below, three types of wireless devices are typically involved in the network 100, and exchange data for computing the location of each operator, while also supporting voice communications. These devices include Mobile Terminals (MT), Fixed Reference (FR) and Main Control (MC).

The Mobile Terminal 110 can include a headset with microphone and earphone assuring hand-free operation. The device is connected to a battery that is part of operator gear. The microphone and the earphone of the Mobile Terminal 110 are connected to a small size transceiver that has three major components, including a Modem, a Controller and a Voice Processor.

Figure 2:
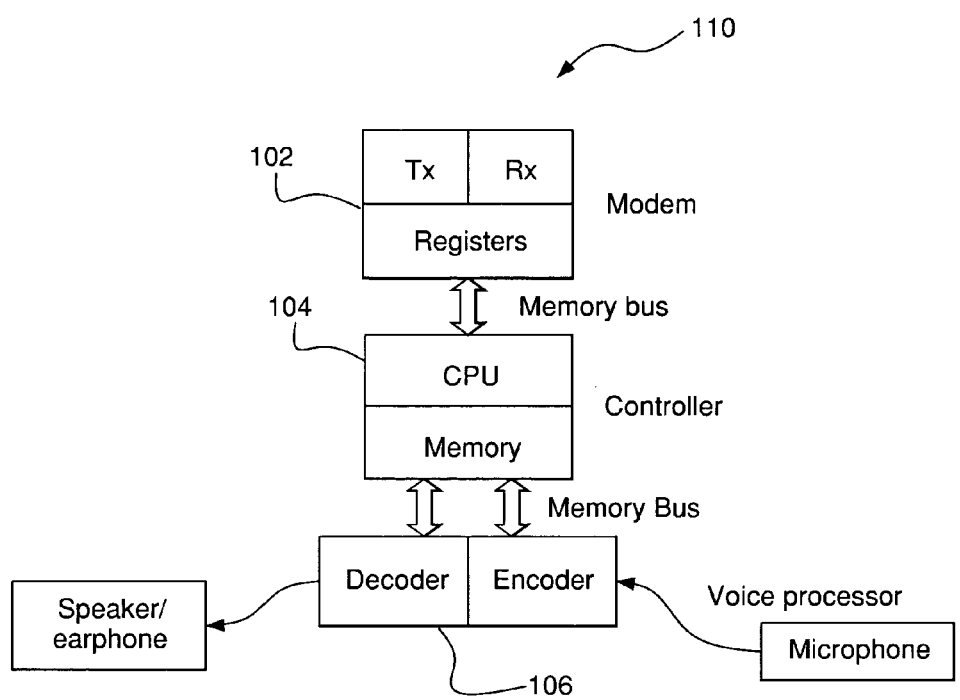
FIG. 2 is a block diagram illustrating an example of a Mobile Terminal used in the network shown in FIG. 1.

FIG. 2 is a block diagram illustrating an example of a Mobile Terminal 110 used in the network 100 of FIG. 1. The Modem 102 assures radio communication with other components of the network using a transmitter and a receiver. The operation of the transmitter and receiver is controlled by storing appropriate data in a memory organized as a set of registers. The receiver and transmitter use the memory registers for providing feedback about the Modem status and the result of executed functions.

The Controller 104 of the Mobile Terminal 110 in FIG. 2 includes a CPU and memory for storing data and the code of the program controlling the Modem functions. It controls Modem activity by writing data in modem registers via a memory bus, and reading Modem registers for finding the modem status.

The Voice Processor 106 of the Mobile Terminal 110 in FIG. 2 includes at least two independent components, an Encoder and a Decoder. The Encoder converts the sound received by microphone into a string of numbers. The Decoder converts the string of numbers back into sound that is sent to a speaker or earphone. The Voice Processor 106 has access to the Controller Memory via a memory bus. In FIG. 2, the activity of all components of the Mobile Terminal device 110 is controlled by the software recorded in the Controller Memory as program code and operating parameters.

Figure 3:
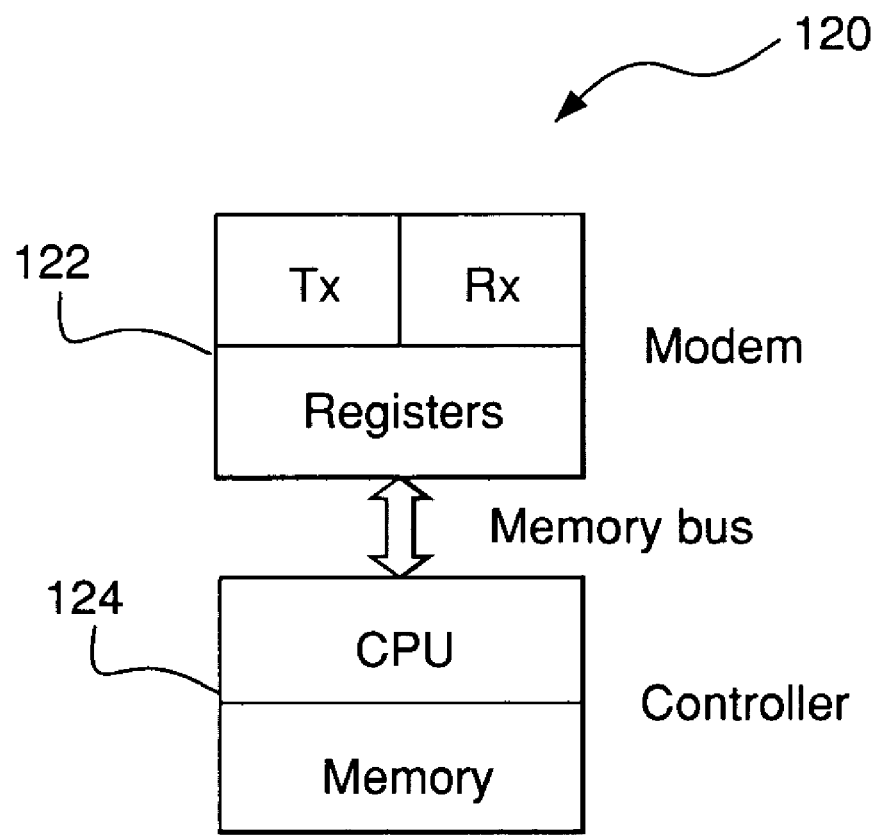
FIG. 3 is a block diagram illustrating an example of a Router providing Fixed Reference in the network shown in FIG. 1.

Returning to FIG. 1, network 100 also includes a number of Fixed References 120-1 to 120-n. Each Fixed Reference 120 provides location reference for computing the position of Mobile Terminals 110. One or two Fixed Reference devices 120 can be installed on each fire truck or other emergency vehicle as required. Still additional portable Fixed References can be installed on tripods and placed around the operating area in random positions. FIG. 3 is a block diagram illustrating an example of both a Wireless Router providing Fixed Reference functionality used in the network 100 of FIG. 1.

The Mobile Terminals 110 and the Fixed References 120 each have a Modem, 102 and 122 respectively, and a Controller, 104 and 124 respectively, performing essentially the same basic functions. The Fixed References 120 each receive messages from Mobile Terminals, Main Control and other Fixed References, and transmits timing and voice data to the Main Control 140.

The Main Control 140-1 to 140-n of FIG. 1, is the brain of the whole system. It coordinates the access to airwaves of all terminals and performs all mathematical operations for computing the position of all Fixed References and Mobile Terminals. The equipment can be installed on a vehicle, such as a van or truck, that can also host one Fixed Reference. The antenna of the Main Control can serve as the origin of the coordinates, while the Fixed Reference installed on Main Control vehicles can provide the OX direction. For the example shown in FIG. 1, the vertical direction is the OZ axis and the direction in front is the OY axis.

Figure 4:
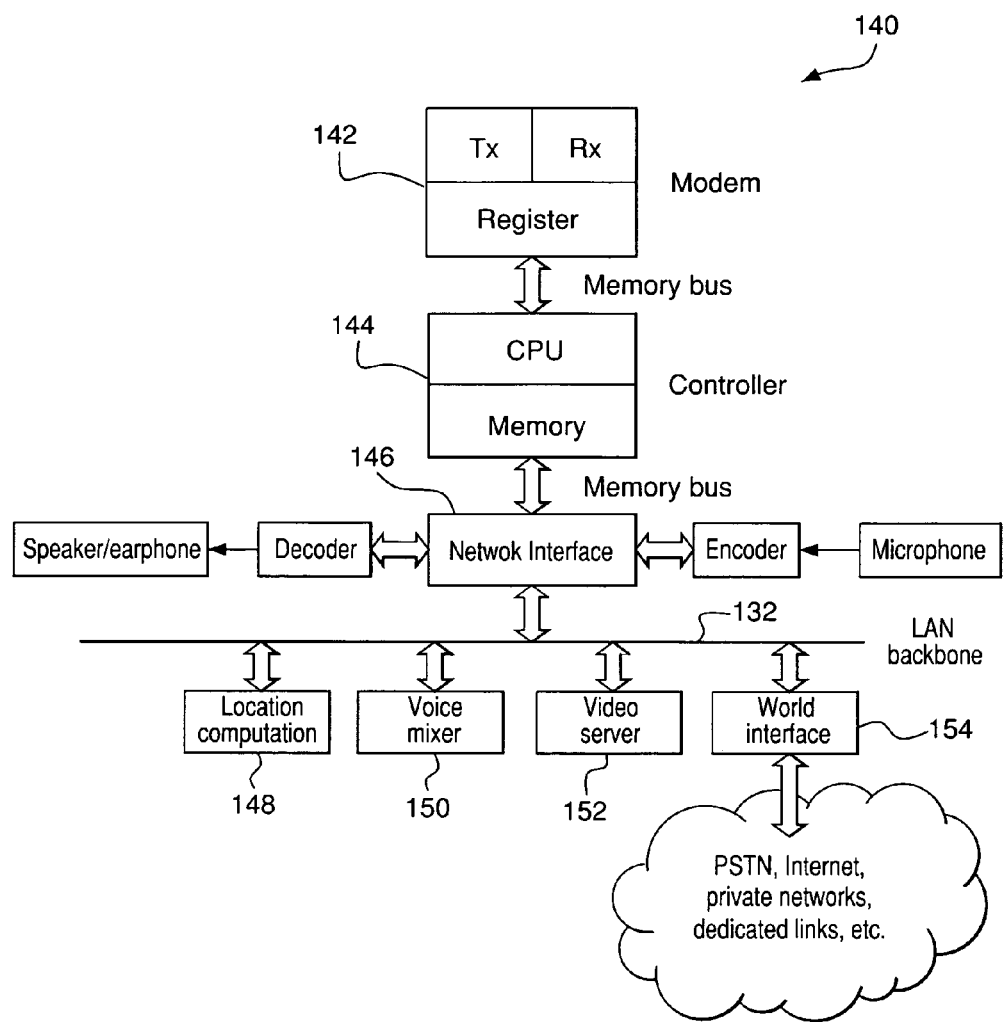
FIG. 4 is a block diagram illustrating an example of Main Control coupling used in the network shown in FIG. 1.

FIG. 4 is a block diagram illustrating an example of the Main Control and Control coupling used in the network of FIG. 1. The Main Control 140 includes a Modem 142 and a Controller 144, performing essentially the same basic functions as for other devices, including transmitting and receiving messages. A Network Interface 146 operates as the interface between the transceiver and the applications running on the Location Computation 148 and Voice Mixer 150.

The Network Interface 146 serves to retrieve data from the Controller memory and transmit it to the other components of the system. It also receives data from the Voice Mixer 150 and stores the packets in Controller memory. The communication between the Controller 144 and the Network Interface 146 is realized via the memory bus. On the other side, the communication between the Network Interface 146 and applications is realized through network sockets.

A Location Computation 148 is coupled to the LAN backbone 132, and can be a very fast computer (i.e. one PC with 1 GB of memory and at least one CPU running at 1.5 GHz or better). It receives data from Network Interface 146 and computes the clock corrections, propagation time and the location of each Fixed Reference 120 and Mobile Terminal 110 using specific mathematical models.

The Voice Mixer 150 is also coupled to the LAN backbone 132, and serves to mix voice data as defined by the operator. The GUI of the Voice Mixer 150 shows a matrix with the Main Control 140 and all Mobile Terminals 110 involved in an operation. Using this interface, the user can define the groups of Mobile Terminals that can hear each other. The Voice Mixer 150 creates new sound from received data and prepares voice data packets according with the mixing matrix. All mixed packets are transmitted to Network Interface which moves them to the Controller memory. The Controller 144 transmits voice data at a particular time during the communication cycle.

A Video Server 152 is also coupled to the LAN backbone 132 and controls various display screens. It shows three views in 2D (front, side and top) and one view in 3D. The Video Server 152 receives the location of each Mobile Terminal 110 and Fixed Reference 120 from the Location Computation system 148 that transmits such information at a rate of at least once per second.

A World Interface 154 is also coupled to the LAN backbone 132 and assures the connectivity to other systems such as PSTN, Internet, Private wireless or wired Networks, Cellular MeshLan™ and other wireless networks like 802.11, for example.

In normal operations, only two radio channels (F0 and F1) are used in accordance with a first embodiment of the present invention. However, some modems can control four channels therefore it is possible to have two independent operations running at the same time using two Main Controls 140, and operating on different radio channels, or one large operation using one Main Control 140 with two transceivers. In the second case, the dual transceiver system allows the processing and the presentation of information on visual displays as one unitary view.

Figure 5:
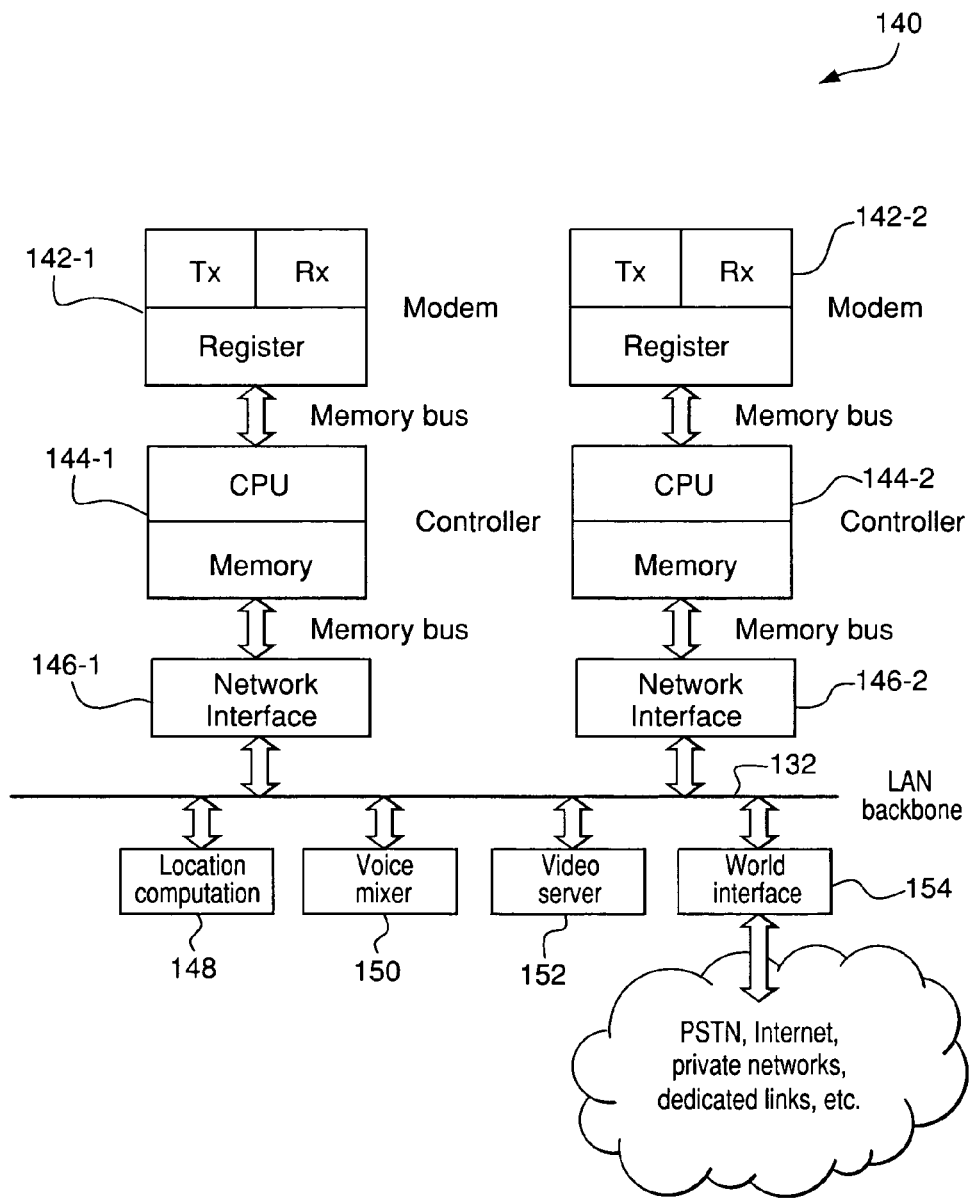
FIG. 5 is a block diagram illustrating an example of a large operation using one Main Control with two transceivers used in the network shown in FIG. 1.

For operations running dual transceivers in the Main Control 140 as shown in FIG. 5, the fact that the two groups are using different communications frequencies has no effect on location representation or voice groups. Data collected from the two groups is processed independently, but the Video Server displays the results from the two groups on the same screen. At Voice Mixer 150, data is received from two different sources, but it is mixed as defined on Voice Mixer GUI matrix. The mixed voice data is built as specified on the Voice Mixer GUI and transmitted in two different frequency channels.

In systems with dual transceivers, the transceiver operating on F0-F1 radio channels has a master role. After it identifies the approximate position of all Mobile Terminals 110 and Fixed References 120, it decides which Mobile Terminal and Fixed Reference should use radio channels F2-F3 managed by the secondary transceiver. The selection allows a uniform spatial distribution across the operating area of Fixed References from both groups and a higher rate of collected location data.

In accordance with an embodiment of the present invention, the Protocol defined below, uses only two radio channels (i.e. frequencies). The first channel (F0) is used for controlling the configuration of the network and for transferring data. The second channel (F1) is used only for transferring data.

The Protocol follows a cyclic set of States. The transmission of messages at each terminal is synchronized with the other terminals in the network by listening to neighbors' transmissions and strictly following the airwave access sequence. The duration of one cycle is not predefined and depends on the number of Fixed References and Mobile Terminals in the network. For a large number of Mobile Terminals and Fixed References, dual transceiver Main Control should be recommended for assuring high rate of collected data.

In the description below, the references to Main Controls 140, Fixed References 120 and Mobile Terminals 110, are in fact references to the transceiver of the mentioned units, not the unit as a whole.

Figure 6:
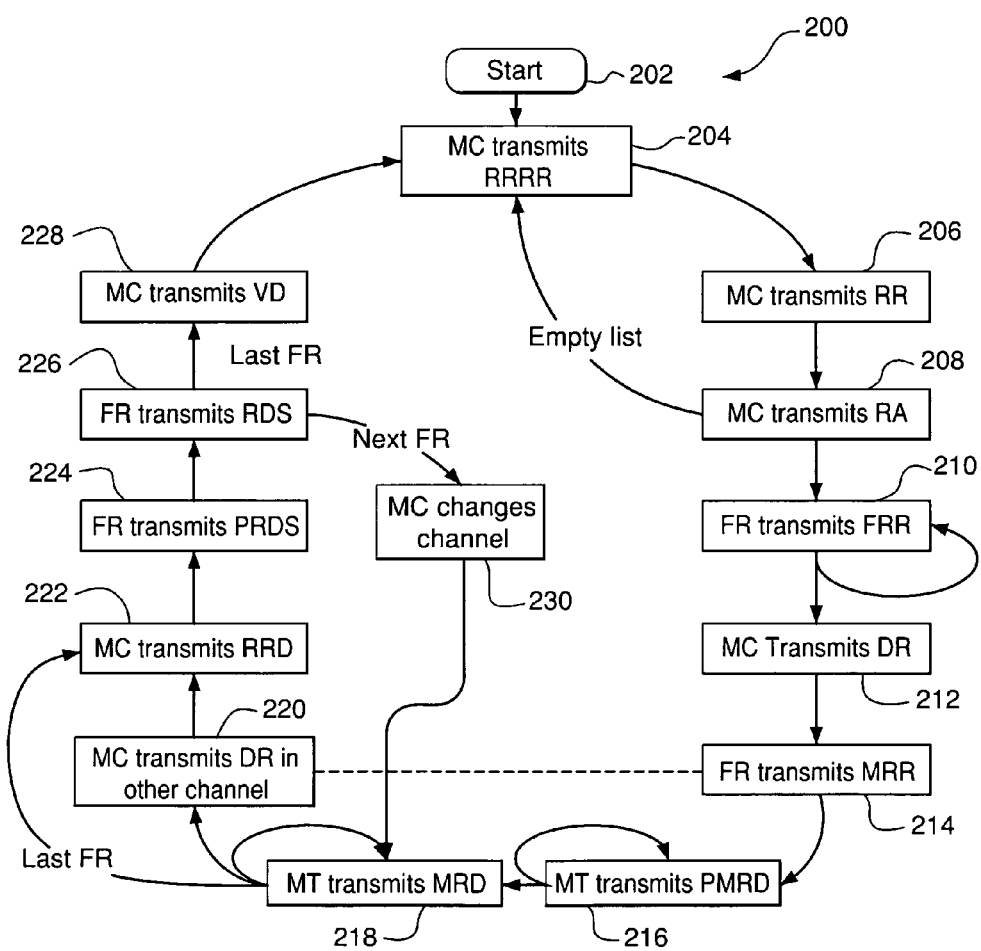
FIG. 6 is a flow chart illustrating an example protocol in accordance with an embodiment of the present invention.

FIG. 6 is a flow chart 200 illustrating an example of the Protocol operating states in accordance with an embodiment of the present invention. As shown in FIG. 6, the Location Protocol proceeds through a number of ordered States 202 to 230 as defined below.

Start State

The Start State 202 is associated with the first moment when the Main Control 140, Mobile Terminals 110, and Fixed References 120 are turned on. In this state all terminals are tuned on F0. After initialization, the Mobile Terminals 110 and Fixed References 120 start listening on F0 for the Main Control 140 to be ready to accept registration requests.

Main Control Transmits RRRR State

After initialization at 202, the Main Control 140 transmits the message Ready to Receive Registration Requests (RRRR) and starts listening at 204. The registration consists in associating a sequence number to each Fixed Reference 120 and to each Mobile Terminal 110. The sequence number is used for establishing the moment when each terminal can access the radio channel. There are two independent sequences, one for Fixed References and another for Mobile Terminals, since at any time only Fixed References or Mobile Terminals can attempt to access a radio channel.

When receiving the RRRR message, Fixed References 120 and Mobile Terminals 110 that do not have a sequence number yet assigned, attempt to submit their identification using the Registration Request (RR) message. Because it is not possible for the Main Control 140 to receive all requests transmitted by all Fixed References and all Mobile Terminals at the same time, a procedure for random submission of Registration request is implemented as described below for the Special Procedure of Registration Using Random Access of F0.

Main Control Receives RR State

The message Registration Request (RR) contains the identification of the terminal submitting the request and a flag stating the nature of the terminal, either Mobile Terminal or Fixed Reference. At 206, the Main Control 140 adds the identification to the proper list, if it is not already there, and associates a sequence number to it. If no terminal submits a RR, Main Control 140 moves to next state after 1 time slice (TS). The meaning of TS is described below for the Special Procedure of Missing Messages and Timeout Handling.

Main Control Transmits RA State

The Registration Acknowledged (RA) message is transmitted at 208. It contains the identification of the station (i.e. Fixed Reference or Mobile Terminal) that registered with the Main Control, the associated sequence number, the voice group number, the data rate and the transmit power that the station has to use for transmitting messages. All Mobile Terminals and Fixed References receiving the message add the sequence number to the internal tables. If at least one of the registration lists is empty, the Main Control submits the RRRR message again, as shown in the feedback connection between 208 and 204 in the flowchart. If each list has at least one element, the Main Control continues with the next state.

The terminal that finds its name in the RA message, retrieves the sequence number it must use from now on for transmitting messages. The RA message may also contain initial configuration parameters that could be changed later. The configuration section of the RA message includes at least two fields, including the identification of the parameter, and the new value of the parameter. Changing the values of parameters is necessary due to the dynamic nature of the network and mobility of MT. In normal conditions, values of parameters are changed only from time to time.

When receiving the RA message, all Fixed References record the Corrected Arrival Time (CAT) of the message according with their own clocks as described below for the Special Procedure of Corrected Arrival Time and Equation (1).

Fixed Reference Transmits FRR State

After receiving the RA message, all fixed terminals that have been registered, start transmitting according with the registration sequence at 210. The Fixed Reference with number zero starts transmitting right after receiving the RA message. It transmits the message Fixed Reference Range (FRR). The message contains only the sequence number of the Fixed Reference transmitting the message.

When Fixed Reference with number one receives the FRR message transmitted by Fixed Reference with number zero, it starts transmitting its own FRR message. After transmitting the FRR message, each Fixed Reference with odd sequence numbers tunes radio channel with frequency F1 while Fixed Reference with even sequence numbers remain tuned on channel F0.

Main Control Transmits DR State

After receiving the FRR from the last Fixed Reference in the registration list, Main Control transmits the Data Request (DR) message at 212. The message has only one field mentioning the sequence number of the Fixed Reference that has to collect and transmit range data from Mobile Terminals.

Normally, the first message asks the Fixed Reference with sequence number zero to collect data. Subsequent messages will increase the sequence number up to the size of the Fixed Reference list.

During the next states, the Main Control listens to the radio traffic and transmits DR messages on alternating channels in a manner that allows simultaneous access to F0 and F1 of FR and MT. This procedure is described below for the Special Procedure of Main Control Channel Access.

Fixed Reference Transmits MRR State

After receiving a DR, the Fixed Reference matching the sequence number indicated in the message transmits the Mobile Range Request (MRR) message at 214. The MRR message contains only the sequence number of the Fixed Reference transmitting the message. The Fixed Reference stores the Transmit Time of the message for further use.

All Mobile Terminals Transmit PMRD State

All Mobile Terminals then transmit the Pre Mobile Range Data message (PMRD) in sequence at 216. The PMRD message contains only the sequence number of the Mobile Terminal transmitting the message. The Fixed Reference records all CAT values when receiving the PMDR messages, while Mobile Terminals record the transmission time.

All Mobile Terminal Transmit MRD State

All Mobile Terminals transmit the Mobile Range Data (MRD) message in sequence at 218. The MRD message contains the sequence number of the Mobile Terminal, the CAT of the last MRR, the Transmit Time of the PMRD and any voice data that is available. A Mobile Terminal starts transmitting when it identifies that the previous terminal in the sequence has finished transmitting its MRD message.

If the Fixed Reference requesting MRR is not the last Fixed Reference in the sequence, each Mobile Terminal tunes to the other channel. If the Fixed Reference is the last one in the sequence, after completing the transmission of MRD message, each Mobile Terminal tunes to F0.

While the Fixed Reference collects data from Mobile Terminals, the Main Control listens to some of the PMRD and MRD, waiting for the MRD transmitted by the last Mobile Terminal in the sequence list. If at the time when the Main Control tunes on each channel, all Mobile Terminals have already completed the transmissions of MRD, the Main Control moves to the next state after waiting as long as it takes to send a MRD message plus one TS.

Main Control Transmits DR in Other Channel State

When the Main Control receives the MRD from the last Mobile Terminal, it changes frequency to the other channel, transmits the DR message and tunes back to previous radio channel at 220.

Main Control Transmits RRD State

The Main Control transmits the Ready to Receive Data message asking the Fixed Reference to transmit the last data collected from Mobile Terminals at 222.

Fixed Reference Transmits PRDS State

After receiving the RRD message, the Fixed Reference transmits the Pre Range Data Set (PRDS) messages at 224. The message contains the Fixed Reference sequence number, the time when it received the last RA message, the CAT when it received FRR from all other Fixed References, the CAT when it received the RRD message and the time when it transmitted the FRR message.

Fixed Reference Transmits RDS State

The Range Data Set (RDS) contains the Fixed Reference sequence number, the time when the Fixed Reference transmitted last PRDS and, for each Mobile Terminal, the time when Mobile Terminal, the clock shift, the propagation time between Fixed Reference and Mobile Terminal and the voice data from Mobile Terminal encoder. The method used for computing the clock shift and the propagation time can be found in published U.S. Patent Application 2004/0005902 entitled "System and method for correcting the clock drift and maintaining the synchronization of low quality clocks in wireless networks" the entire contents of this application being incorporated herein by reference.

At 226, the Main Control retrieves the PRDS and RDS messages transmitted by FR and forwards their content, together with the receive CAT and transmit time, to the Network Interface for dispatching data to Location Computation and to Voice Mixer. The FR transmits those two messages one after another. The first message has a fixed length and contains the identification of the FR and the length of the next message. The second message contains the time when first message has been transmitted and data FR has collected from MTs (i.e. timing and voice data).

Main Control Changes Channel State

If the Fixed Reference that just transmitted the RDS is not the last in the list, the Main Control tunes to the other channel at 230 and listens to Mobile Terminals transmitting MRD. Otherwise, the Main Control moves to the next state. After receiving data from the last MT in the list at 218, Main Control transmits DR at 220 or RRD at 222. The two messages are transmitted in alternating channels. If the FR list has been exhausted, 220 has no subject to be executed, and MC executes 222.

Main Control Transmits Voice Data State

At 228, the Main Control checks if any voice data from the Voice Mixer is available and transmits it with the Voice Data (VD) message. The content of the VD message is built by the Voice Mixer according with the mixing matrix. The message is a list of voice packets, and each voice packet contains the voice group identification number and voice data for the group.

The Mobile Terminal receiving the VD message identifies the voice data to retrieve from the voice packet based on own voice group number (received with RA) and moves data to the decoder buffer.

As noted above, several Special Procedures can be provided by the embodiment of the present invention. A number of examples are presented and described below.

Registration Using Random Access of F0

All Fixed References and Mobile Terminals should have a sequence number in order to transmit any message, excluding the RR message. The sequence number is provided by the Main Control at the end of an exchange of several messages, such as those listed below:

Main Control transmits RRRR

Fixed Reference or Mobile Terminal transmits RR

Main Control confirms registration with RA

A system can have a large number of unregistered Fixed References and Mobile Terminals, and since it is not possible to have all Fixed References and Mobile Terminals transmitting RR in the same time and the Main Control receiving and understating all of them, a first Special Procedure is provided to implement a random access to a frequency channel in accordance with an embodiment of the present invention.

The Procedure uses a random number generator that has as seed the terminal identification number. It makes sure that each terminal generates a different sequence of random numbers. The procedure generates numbers between 0 and $2^{32}-1$. The random access algorithm uses a threshold variable "submitRR" for deciding if the terminal can, or cannot submit its registration. At every cycle, if the randomly generated number is smaller than the value of the submitRR variable, the station can submit its Request for Registration (RR). If the random number is larger, the station does not submit the RR during that cycle, but it listens to the RR messages submitted by other stations and the reply of the Main Control.

The initial value of the submit variable submitRR is set to $2^{26}$. With this value, in average, only 1 out of 64 randomly generated numbers is larger than the value of submitRR. The value of the submitRR variable should be modified as follows:

if the terminal submits a RR but the Main Control replies with RA for another terminal or the Main Control does not reply al all, the value of submitRR is divided by 2 (possible interference);

if the terminal does not submit a RR and cannot hear any terminal submitting a RR and the Main Control broadcasts empty RA, the value of submitRR is multiplied by 2 (small number of unregistered terminals);

if the terminal does not submit a RR but can hear another terminal submitting RR and the Main Control does not reply or replies with a third terminal identification, the value of submitRR is divided by 2 (too many simultaneous RRs); and in all other cases the value of submitRR is not changed.

When changing the value of submitRR variable, it should be kept between 1 and $2^{31}$.

Missing Messages

In the network of FIG. 1, it can be expected that each terminal receives signals from a large number of other terminals, if not from all of them. The Main Control 140 can be a fixed terminal that is not limited by the use of batteries and can transmit messages at a maximum energy level. The Fixed References 120 can also be fixed terminals that may have larger batteries, thus are not restricted from using very high transmit energy. The Mobile Terminals are portable, therefore have smaller batteries and have to use appropriate transmitting energy for saving battery operating time.

Although this is not a Time Division environment, one embodiment can use the term Time Slice (TS) for marking an interval of time that is used for timing out some events that do not happen, or the time period during which a terminal is waiting for completion and cannot receive any information. The size of TS will be determined through simulations and experiments, but is expected to be between 100 and 500 μs.

A second Special Procedure uses such time slots (TS) in dealing with missing messages. In all cases, when a terminal waits for a message to be transmitted and the message is not received before the timeout, the terminal moves to the next State. The situation is reported as an empty slot in the RDS or PMDR messages. The Main Control checks the frequency of empty slots and adjusts transmission parameters of frequently missing terminals to prevent the situation from happening again. The number of TS used for timing out waiting periods depends on the size of the expected message, and normally, the time out is equal to the transmission time of the message plus one TS.

Main Control Channel Access

After transmitting the FRR message, all Fixed References with odd sequence numbers tune on channel F1, while those with even sequence numbers remain tuned on channel F0. When a Fixed Reference reaches its turn, it submits the MRR message and then receives data from all Mobile Terminals. The Main Control listens to Mobile Terminals replying to MRR with PMRD and MRD. In a third Special Procedure, when the last Mobile Terminal has finished transmitting the MRD message, the Main Control tunes to the other channel and transmits DR for the next Fixed Reference. Then it tunes again to another channel, in this case, back to the previous channel because the example is using only two channels, wait for channel to be clear and transmits RRD assuring the Fixed Reference that it is ready to receive the RDS. While the Main Control receives the RDS in one channel from one fixed reference, on the other channel the next Fixed Reference in the sequence transmits its MRR and receives PMRD and MRD from Mobile Terminals. When the Main Control finishes receiving RDS, it tunes to the other channel waiting for the last Mobile Terminal to submit MRD. If the list of Mobile Terminals is too small, or RDS has voice data from too many MTs at the same cycle, it is possible that the Main Control arrives on the next channel after all MRD have been transmitted. In such cases, the Main Control moves to the next state after waiting as long as the duration of a MRD plus one TS.

In this scheduling scheme, the Main Control tunes between the two channels twice for each Fixed Reference, while Fixed References remain tuned on the same channel waiting for the DR message for starting the collection of data.

Corrected Arrival Time

In a fourth Special Procedure, the Corrected Arrival Time (CAT) of a message can be computed from the Arrival Time (AT) measured in TC, which is the content of the TDMA clock at the time when the "Receive Complete" interrupt occurs, and the values of the autocorrelation function retrieved from the modem registers as shown in Equation (1) below.

$$corr = 0.5 \frac{a_{+1} - a_{-1}}{a_{+1} + a_{-1} - 2a_0} \quad (1)$$

$$cat = (AT + corr * (\alpha * |corr| + \beta)) * 31.25$$

The values of α and β parameters are specific to the auto-correlation function currently implemented in modem. In the embodiment presented in published U.S. Patent Application 2003/227895 referenced above, these values were α=−1.1449 and β=1.5694. In these equations the AT (Arrival Time) is the content of the TDMA clock register at the message arrival moment, while $a_{-1}$, $a_0$ and $a_{+1}$ are the values of the autocorrelation function one TC before the arrival moment, at the arrival moment and one TC after the arrival moment.

Parameter Correction

The Main Control typically maintains an indicator of frequency of missed receptions (i.e. identification of empty slots). Based on this indicator, the Main Control can make an evaluation for transmit power and data rate adjustment in a fifth Special Procedure. When there is a need for increasing or decreasing the energy per bit, the Main Control transmits the RA message mentioning the identification of the terminal, the sequence number and the new power and data rate of the Mobile Terminal or Fixed Reference.

Default Data Rate and Transmit Power

The Main Control preferably transmits using the maximum power and the lowest data rate (i.e. 1 Mbps). All other terminals transmit messages at the data rate and power level specified in last RA addressed to the terminal. In a sixth Special Procedure, at registration time, the Main Control makes an evaluation of the signal level from Mobile Terminals and from Fixed References, and computes approximate transmit parameters. After the Mobile Terminal exchanges messages with the network, the transmit parameters are identified with a better precision. The RR, RA and FRR messages are transmitted at minimum data rate and maximum power.

Timeout Handling

When a terminal waits for a message to be received, it moves to the next state if a timeout occurs. In a seventh Special Procedure, the timeout is set to some value depending on the length of the expected message plus one TS. The timeout clock must be reset when a synchronization sequence is received and the interrupt Start To Receive is generated.

Figure 7:
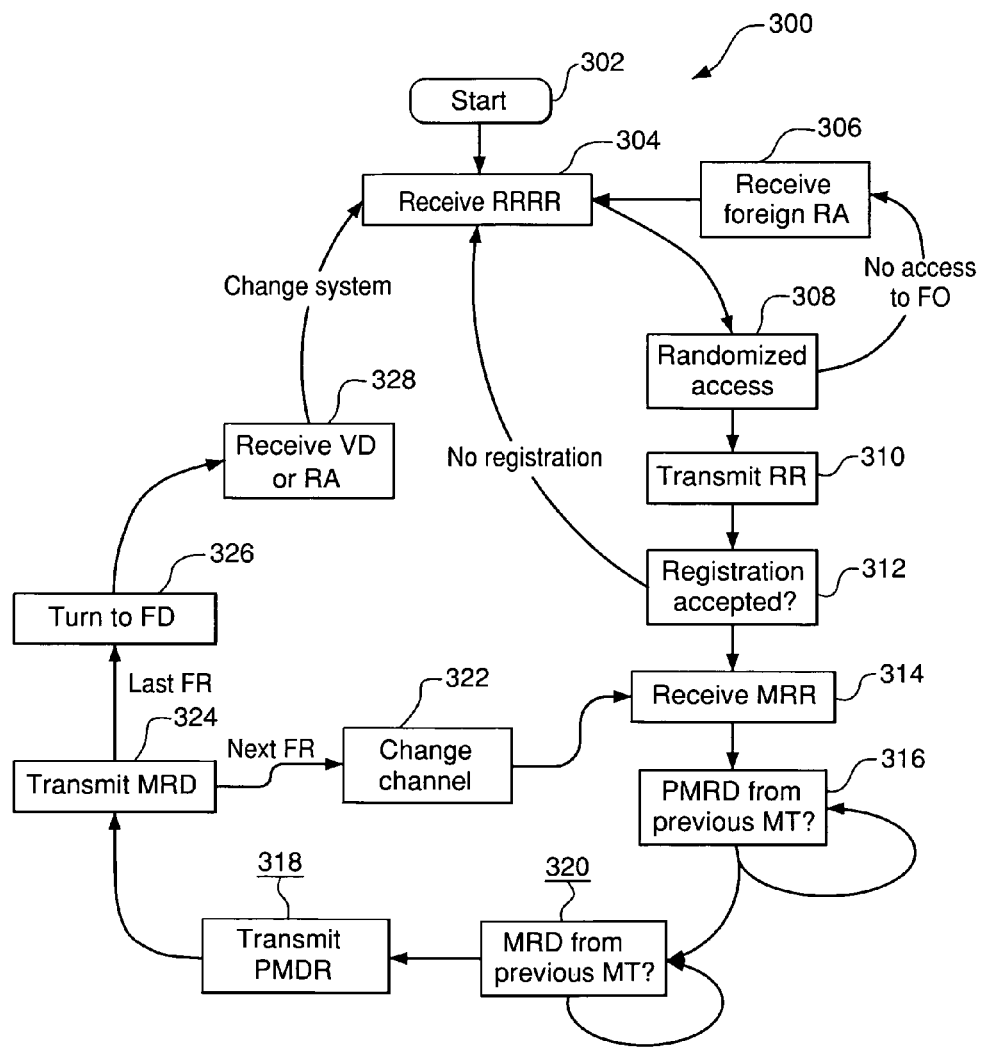
FIG. 7 is a flow chart illustrating an example of the Mobile Terminal task in the protocol of FIG. 6.

In the embodiment of the present invention described above, the Mobile Terminals 110 of FIG. 1 execute the following operations as shown in FIG. 7. FIG. 7 is a flow chart 300 illustrating an example of the Mobile Terminal task steps 302 to 328 in the Protocol of FIG. 6.

Start: When first started, the Mobile Terminal tunes to F0 and starts listening at step 302.

Receive RRRR: The Mobile Terminal waits for the Main Control to transmit the RRRR message, indicating it is available for receiving registration requests at step 304.

Randomized access: After receiving the RRRR message, the Mobile Terminal checks if it can access the F0 channel at the current cycle at step 308. If the result is negative, the Mobile Terminal waits for the next RA message.

Receive foreign RA: Even if the Mobile Terminal does not have access to F0 for transmitting its registration request, it should listen to the RR submitted by other terminals, to RA addressed to them, and record the terminal parameters in internal tables at step 306.

Transmit RR: If the test for accessing the F0 channel is successful, the Mobile Terminal transmits the Registration Request (RR) message and starts waiting for RA at step 310.

Registration accepted?: The Main Control always transmits a RA, even if it cannot understand the transmission in F0 channel or no RR was submitted, as shown in step 312. After transmitting the RR in step 310, the MT has to listen to the RA and identify if its registration has been accepted or not. If the registration has not been accepted, the MT returns to Receive RRRR state in step 304. If the registration has been accepted, it moves to next state.

In step 306 the MT receives a foreign RA. The received RA refers to another terminal or to no terminal at all. In this state the Mobile Terminal modifies the value of submitRR according with the algorithm described in the first Special Procedure, Registration Using Random Access of F0 described above. The Mobile Terminal then retrieves the information about the other terminal, if any, and starts waiting for next RRRR message.

If the RA message refers to the current Mobile Terminal, it retrieves its sequence number and transmission parameters and prepares to receive the MRR message.

Receive MRR: The Mobile Terminal waits to receive the MRR message from the Fixed Reference at step 314. When the message arrives, the Mobile Terminal records the arrival time. It will be later transmitted to the Fixed Reference.

PMRD from previous MT?: The Mobile Terminal with sequence number zero moves to the next state. If the Mobile Terminal has another sequence number than zero, it listens to PMRD transmitted by neighbors at step 316. When it receives the PMRD transmitted by the previous Mobile Terminal in the sequence list, it moves to next State.

MRD from previous MT?: If the Mobile Terminal has a sequence number greater than zero, it waits for previous Mobile Terminals in sequence to transmit the MRD message at step 320. If the sequence number of the MT is zero, it moves to next state.

Transmit PMRD: The PMRD message contains only the sequence number of the Mobile Terminal and the length of the MRD message. It is used for timing purposes and for preparing the next data transfer.

Transmit MRD: Immediately after transmitting the MRD message, the Mobile Terminal transmits the MRD message at step 324. The message contains the Mobile Terminal sequence number, the time when the Mobile Terminal received the MRR message, the time when the Mobile Terminal transmitted the PMRD message and any voice data, if it is available from the voice encoder.

Change channel: If the MRD was not transmitted to the last Fixed Reference in the list of references, the Mobile Terminal tunes to the other channel in step 322 and waits to receive MRR from the next Fixed Reference in the list.

Tune to F0: If the last communication was addressed to the last Fixed Reference in sequence list, the Mobile Terminal tunes to channel F0 in step 326. If it is not the last in the list, the Mobile Terminal tunes to the other channel in step 322 and starts waiting for the MRR from next Fixed Reference in the list at step 314.

Receive VD and RA: In step 328, the Mobile Terminal is waiting for the VD or RA message from the Main Control. In this state, the Mobile Terminal can receive many other messages, that are discarded. From the VD message, the terminal selects the voice data with the correct group number and forwards it to the voice decoder. After the reception of the VD message, the MT remain in the same state waiting for another VD or for the RA messages. The first received RA message could be empty, could refer to a new registration of a new terminal, could change transmit parameters of a terminal or could request a terminal to move to the other set of frequencies (i.e. to secondary Main Control transceiver). All the Mobile Terminals receiving the RA message retrieve the information and update internal tables accordingly. In this embodiment, moving a terminal to another system means to delete the terminal from the current system. The Mobile Terminal moving to the other system changes its set of radio channels and waits for the RRRR message on new frequency.

Figure 8:
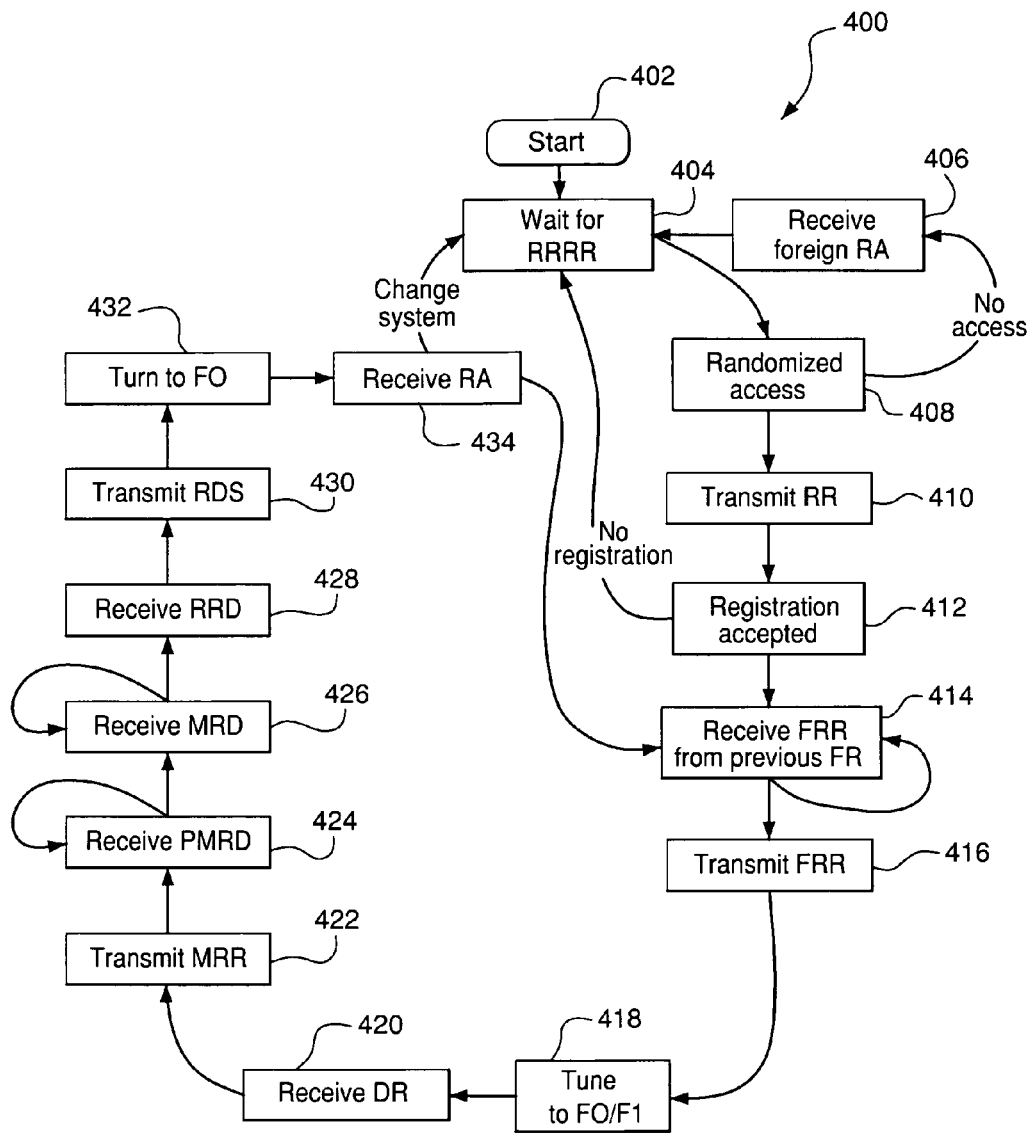
FIG. 8 is a flow chart illustrating an example of the Fixed Reference task in the protocol of FIG. 6.

In the embodiment of the present invention described above, the Fixed References 120 of FIG. 1 execute the following operations as shown in FIG. 8. FIG. 8 is a flow chart 400 illustrating an example of the Fixed Reference task steps 402 to 434 in the Protocol of FIG. 6.

Start: When first started, the Fixed Reference tunes to F0 and starts listening at 402.

Receive RRRR: The Fixed Reference waits for the Main Control to transmit the RRRR message indicating that it is available for receiving registration requests at step 404.

Randomized access: After receiving the RRRR message, the FR checks if it can access the F0 at this cycle. If the result is negative, FR waits for the next "foreign" RA message at step 408.

Receive foreign RA: When the Fixed Reference does not have access to F0 for transmitting its registration request, it has to listen to the RR transmitted by other terminals and the next RA, record the parameters of the terminal specified in this message and correct the value of "submitRR" parameter at step 406.

Transmit RR: When the access test is successful, the Fixed Reference can transmit the Registration Request (RR) message and starts waiting for RA at step 410.

Registration accepted?: The Main Control responds with an RA that may refer to the terminal that just submitted the request, to another terminal, or to nobody (empty RA) at step 412. If the RA refers to another terminal or to no terminal at all, the Fixed Reference modifies the value of submitRR according to the algorithm described in the first Special Procedure Registration Using Random Access of F0, described above. If the RA message identifies the registration of another terminal, the Fixed Reference retrieves the sequence number and transmitting parameters of the registered terminal and waits for MC to transmit the next RRRR.

If the RA message refers to the current Fixed Reference, it retrieves its sequence number and transmission parameters and prepares to receive the FRR message.

Receive FRR: After receiving the RA message from the Main Control, all Fixed References start transmitting the FRR message at step 414. For transmitting the message, each Fixed Reference has to wait until the previous Fixed Reference in the sequence list has finished transmitting its FRR.

Transmit FRR: The Fixed Reference transmits the FRR message containing only the sequence number of the Fixed Reference at step 416.

Tune to F0/F1: After transmitting FRR each Fixed Reference moves to the channel associated to its sequence number at step 418. Fixed References with odd sequence numbers tune to channel F1, while Fixed References with even sequence numbers remain tuned to F0.

Receive DR: After tuning the transceiver to the new frequency, the Fixed Reference waits for the DR message at step 420.

Transmit MRR: After receiving the DR message, the Fixed Reference submits the MRR message, requesting data from Mobile Terminals at step 422.

Receive PMRD: The Fixed Reference receives the PMRD messages from the Mobile Terminals at step 424. These messages contain only the sequence number of the Mobile Terminal transmitting the message and the length of the next message. The Fixed Reference records the arrival time of each message for further reference.

Receive MRD: The Fixed Reference receives MRD messages from all Mobile Terminals and computes the propagation time and clock correction at step 426.

Receive RRD: After receiving data from all Mobile Terminals, the Fixed Reference waits for the Main Control to be ready to receive data at step 428. The Main Control communicates this fact by transmitting the RRD message.

Transmit RDS: The Fixed Reference transmits the RDS message that contains the propagation time of the signal between Fixed Reference and all Mobile Terminals at step 430.

Tune to F0: The Fixed Reference has finished its work for the current cycle and tunes to channel F0 at step 432.

Receive RA: The Fixed Reference waits for the next RA message from the Main Control at step 434. During this step, the FR may receive VD message that are discarded. The received RA message could be empty, could refer to a new registration of a terminal, could change transmit parameters of a terminal, or could request a terminal to move to the other set of frequencies (i.e. to secondary Main Control transceiver). All terminals receiving this message retrieve the information and update the internal tables accordingly. As with the Mobile Terminal, moving a Fixed Reference to another system means to delete the terminal from the current system. The Fixed Reference moving to the other system changes its set of radio channels and waits for the RRRR message from the other Main Control.

Figure 9:
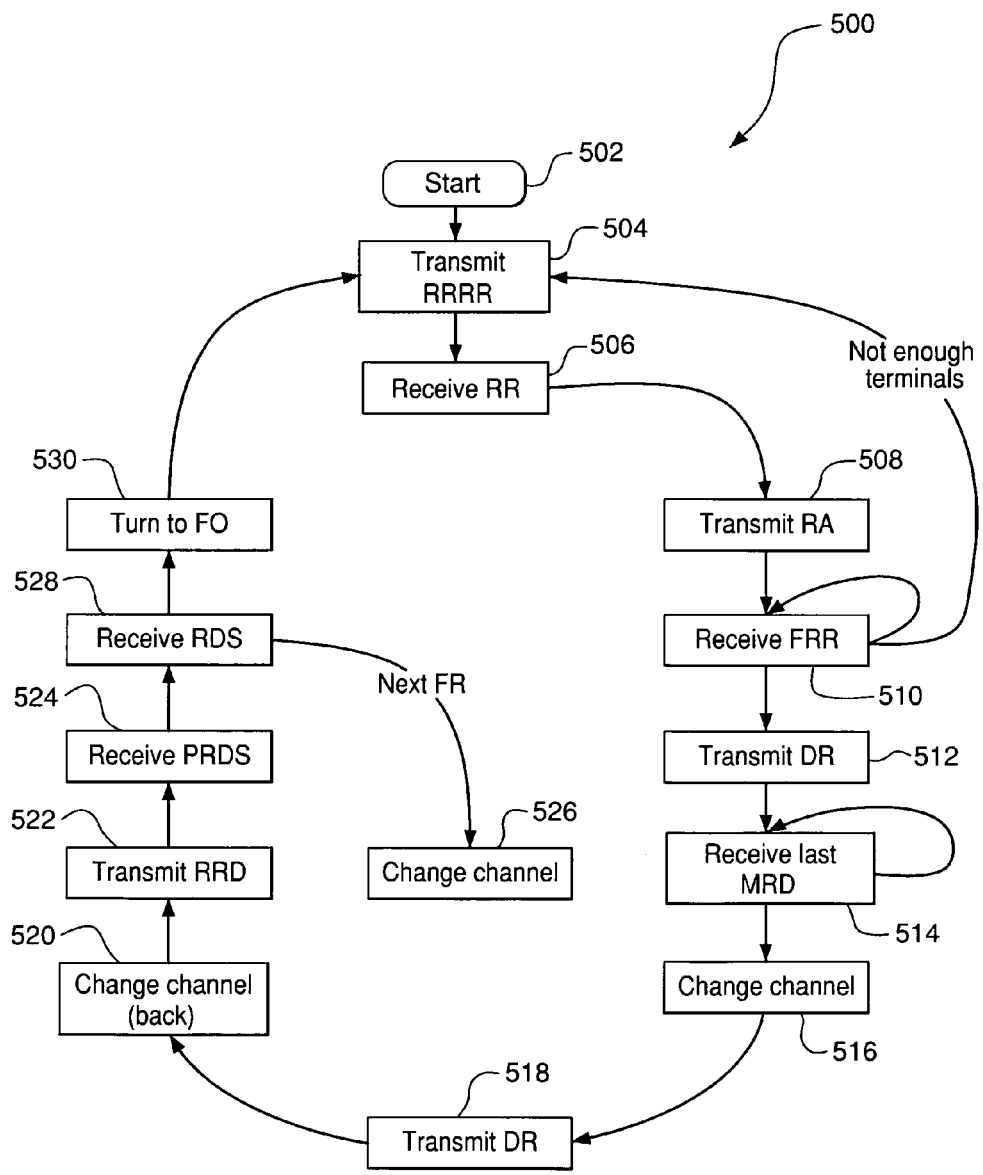
FIG. 9 is a flow chart illustrating an example of the Master Control task in the protocol of FIG. 6.

In the embodiment of the present invention described above, the Main Control of FIG. 1 execute the following operations as shown in FIG. 9. FIG. 9 is a flow chart 500 illustrating an example of the Main Control task steps 502 to 530 in the Protocol of FIG. 6.

Start: When first started Main Control tunes to channel F0 and gets ready to transmit at step 502.

Transmit RRRR: The Main Control transmits the Ready to Receive Registration Requests for asking Mobile Terminals and Fixed References to register at step 504.

Receive RR: If any unregistered Mobile Terminal or Fixed Reference receiving the RRRR message has access to F0 in that cycle, it transmits the RR message. The Main Control receives the message and adds the terminal to the specific sequence list at step 506. If no terminal transmits any RR messages, or there is interference on the F0 channel and the Main Control cannot understand any message, at timeout it transmits the parameter change or an empty RA.

Transmit RA: If at least one terminal was registered, the Main Control transmits the RA message containing the identification and the sequence number of the terminal and the transmit parameters at step 508.

If no new terminal was registered, the Main Control checks if there is any need for changing the transmit energy of any Mobile Terminal or Fixed Reference already registered. If there is a need to change, the Main Control transmits a RA with the new parameters.

The Location Computation may send to the Main Control a list of terminals that have to move from one transceiver to the other. The selection of Mobile Terminals and Fixed References associated to each transceiver is based on each terminal location. The Main Control submits RAs ordering terminals to change the frequency according with the relocation list.

If there is no need to change frequency of any terminal, the Main Control transmits an empty RA.

Receive FRR: After receiving the RA, all registered Fixed References answer with FRR messages at step 510. The Main Control receives all these messages and records the CAT for each Fixed Reference. If the list of Fixed Reference or the list of Mobile Terminals is empty, the Main Control returns to the Transmit RRRR state. Otherwise, it moves to the next state.

Transmit DR: After receiving the FRR from last Fixed Reference, the Main Control transmits a DR for the Fixed Reference with sequence number zero, and starts the data collection cycle at step 512.

Receive last MRD: The Main Control listens to Mobile Terminals responding to the Fixed Reference with MRD messages at step 514.

Change channel: After the MRD from the last Mobile Terminal in the sequence list is received, the Main Control tunes on the other channel at step 516.

Transmit DR: In the new channel, the Main Control transmits a DR message for starting the activity of next Fixed Reference in the sequence list at step 518.

Change channel (back): After transmitting the DR message in one channel, the Main Control tunes back to the other channel at step 520.

Transmit RRD: The Main Control transmits the Request for Range Data at step 522. The message makes the Fixed Reference aware that the Main Control is ready to receive range data.

Receive PRDS: The Main Control receives the PRDS message and records the arrival time at step 524.

Receive RDS: Then the Main Control receives the RDS message containing all data necessary for computing the distance between the Main Control and the Fixed Reference at step 528. If the last received RDS is not from the last Fixed Reference in the sequence list, the Main Control tunes to the other channel and starts listening to MRD messages transmitted by Mobile Terminals at step 526.

Tune to F0: After receiving RDS from all Fixed References, the Main Control sends collected data to the Network Interface for dispatching it to Location Computation and Voice Mixer and tunes to F0 for starting a new cycle at step 530.

One of the key elements of this invention is the precision of the Arrival Time. All moments of Arrival Time at MC, FR or MT are corrected using the CAT procedure. The same timing information is used for computing the distances between terminals, for computing clock drift and for correcting the Arrival Time. Details about the method used for correcting clock drift can be found in published U.S. Patent Application Serial No. 2004/0005902 entitled "System and method for correcting the clock drift and maintaining the synchronization of low quality clocks in wireless networks", the entire content of which is incorporated herein by reference.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A method for optimizing communication within a wireless network comprising a plurality of nodes including at least one mobile node and at least one fixed node, the method comprising:
   at a fixed node:
      transmitting a request signal to the plurality of mobile nodes,
      recording a time of transmission of the request signal,
      receiving a first reply signal from a mobile node,
      recording an arrival time of the first reply signal,
      receiving a second reply signal from the mobile node, wherein the second reply signal includes a time of transmission of the first reply signal and a time of reception of the request signal, and
      computing a propagation time and a clock correction associated with the mobile node using the recorded arrival time of the first reply signal, the received time of transmission of the first reply signal, the recorded time of transmission of the request signal, and the received time of reception of the request signal.

2. A method for optimizing communication within a wireless network as claimed in claim 1, further comprising after the step of transmitting the request signal:
   at the mobile node:
      receiving the request signal,
      recording the time of reception of the request signal,
      transmitting the first reply signal,
      recording the time of transmission of the first reply signal, and
      transmitting the second reply signal including the time of transmission of the first reply signal and the time of reception of the request signal.

3. A method for optimizing communication within a wireless network as claimed in claim 2, further comprising:
   at each of the plurality of mobile nodes, performing the steps of receiving the request signal, recording the time of reception of the request signal, transmitting a respective first reply signal, recording a respective time of transmission of the respective first reply signal, and transmitting a respective second reply signal including the recorded respective time of transmission of the respective first reply signal and the recorded respective time of reception of the request signal; and
   at the fixed node, repeating for each of the plurality of mobile nodes the steps of receiving the respective first reply signal, recording a respective arrival time of the respective first reply signal, receiving the respective second reply signal, and computing a respective propagation time and a respective clock correction associated with each of the mobile nodes using the recorded respective arrival time of the respective first reply signal, the received respective time of transmission of the respective first reply signal, the recorded time of transmission of the request signal, and the received respective time of reception of the request signal.

4. A method for optimizing communication within a wireless network as claimed in claim 3, further comprising:
   at each of the fixed nodes, transmitting a respective request signal to the plurality of nodes, recording a time of transmission of the respective request signal, and repeating for each of the plurality of mobile nodes the steps of receiving the respective first reply signal, recording a respective arrival time of the respective first reply signal, receiving the respective second reply signal, and computing a respective propagation time and a respective clock correction associated with each of the mobile nodes using the recorded respective arrival time of the respective first reply signal, the received respective time of transmission of the respective first reply signal, the recorded time of transmission of the request signal, and the received respective time of reception of the request signal.

5. A method for optimizing communication within a wireless network as claimed in claim 4, further comprising:
   at each of the mobile nodes, repeating for each of the plurality of fixed nodes the steps of receiving the respective request signal, recording the time of reception of the respective request signal, transmitting a respective first reply signal, recording a respective time of transmission of the respective first reply signal, and transmitting a respective second reply signal including the recorded respective time of transmission of the respective first reply signal and the recorded respective time of reception of the respective request signal.

6. A method of optimizing communication within a wireless network as claimed in claim 5, the wireless network further comprising a main control, the method further comprising:
   at the main control:
      receiving a registration request from one or more of the nodes,
      assigning a respective sequence number to each of the registration requesting nodes; and
   at each of the registration requesting nodes:
      receiving the sequence number, and
      transmitting one or more messages at a transmission schedule based on the sequence number.

7. A method of optimizing communication within a wireless network as claimed in claim 6, further comprising prior to the step of receiving the registration request:
   transmitting a ready to receive registration requests message from the main control to the nodes; and transmitting the registration request message by each of the registration requesting nodes in response to receiving the ready to receive registration requests message from the main control.

8. A method of optimizing communication within a wireless network as claimed in claim 6, further comprising:
at the main control:
identifying a fixed node sequence comprising a plurality of sequential fixed node sequence numbers, and
identifying a mobile node sequence comprising a plurality of sequential mobile node sequence numbers,
wherein the step of assigning the respective sequence number to each of the registration requesting nodes comprises:
assigning a fixed node sequence number when the requesting node is a fixed node, and
assigning a mobile node sequence number when the requesting node is a mobile node.

9. A method for optimizing communication within a wireless network as claimed in claim 6, wherein:
the registering request includes a respective registration request signal to the main control after receiving a ready to receive registration requests signal from the main control.

10. A method for optimizing communication within a wireless network as claimed in claim 7, further comprising:
transmitting respective registration acknowledgement signals, each including a respective sequence number of a node, to the mobile nodes and the fixed nodes in response to the respective registration request signals received from the mobile nodes and fixed nodes.

11. A method for optimizing communication within a wireless network as claimed in claim 10, further comprising:
recording by each of the fixed nodes, a respective corrected arrival time based on its own clock upon receipt of its respective registration acknowledgement signal.

12. A method for optimizing communication within a wireless network as claimed in claim 11, wherein:
the respective corrected arrival time is based on the arrival time of the respective registration acknowledgement signal and an autocorrelation function associated with a modem in the respective fixed node.

13. A method for optimizing communication within a wireless network as claimed in claim 11, further comprising:
transmitting by each of the fixed nodes, a respective fixed reference range signal to the main control including data representing its respective corrected arrival time.

14. A method for optimizing communication within a wireless network as claimed in claim 13, further comprising:
storing by the main control each respective corrected arrival time data for each respective fixed node from which a respective fixed reference range signal was received.

15. A method for optimizing communication within a wireless network as claimed in claim 7, wherein the step of transmitting the registration request signal comprises:
transmitting by each node its respective registration request signal based on a value of a random number generated by a random number generator in the node.

16. A method for optimizing communication within a wireless network as claimed in claim 7, wherein the step of transmitting the registration request message comprises:
transmitting by each node its respective registration request signal over a same frequency.

* * * * *